United States Patent
Sung et al.

(10) Patent No.: US 10,952,270 B1
(45) Date of Patent: Mar. 16, 2021

(54) DYNAMIC SHARING OF SECONDARY NODE RESOURCES AMONG MULTIPLE PRIMARY NODES IN DUAL-CONNECTIVITY SERVICE

(71) Applicant: Sprint Spectrum L.P., Overland Park, KS (US)

(72) Inventors: Sanghoon Sung, Ashburn, VA (US); Yun Sung Kim, Ashburn, VA (US); George W. Harter, III, Ashburn, VA (US); Udit Thakore, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/417,094

(22) Filed: May 20, 2019

(51) Int. Cl.
| | |
|---|---|
| *H04W 4/00* | (2018.01) |
| *H04W 76/15* | (2018.01) |
| *H04W 72/12* | (2009.01) |
| *H04W 88/08* | (2009.01) |
| *H04W 72/04* | (2009.01) |
| *H04W 92/10* | (2009.01) |
| *H04W 72/10* | (2009.01) |

(52) U.S. Cl.
CPC ....... *H04W 76/15* (2018.02); *H04W 72/0453* (2013.01); *H04W 72/10* (2013.01); *H04W 72/1247* (2013.01); *H04W 88/08* (2013.01); *H04W 92/10* (2013.01)

(58) Field of Classification Search
CPC . H04W 76/15; H04W 72/0453; H04W 72/10; H04W 72/1247; H04W 88/08; H04W 92/10
See application file for complete search history.

(56) References Cited

U.S. PATENT DOCUMENTS

| | | | |
|---|---|---|---|
| 2016/0219475 A1* | 7/2016 | Kim | H04W 76/27 |
| 2019/0058570 A1* | 2/2019 | Zhang | H04W 76/27 |
| 2019/0174371 A1* | 6/2019 | Lee | H04W 36/0072 |
| 2020/0128601 A1* | 4/2020 | Willars | H04W 76/15 |

* cited by examiner

*Primary Examiner* — Candal Elpenord
*Assistant Examiner* — Xuan Lu

(57) ABSTRACT

In an arrangement where an access node (e.g., a Node-B) is used in dual-connectivity service of UEs that are served by other access nodes, resources of the access node could be dynamically allocated to the UEs based at least on respective priorities designated for the other access nodes. For instance, each other access node could be prioritized based on its type, such as whether it is a macro access node, a small-cell access node, an indoor access node, an access node for a special event, or a access node for dedicated service, among other possibilities, and allocation of resources of the jointly-used access node could be defined based on these priorities, giving higher resource-allocation priority to UEs that are served by a higher priority other access node and giving lower resource-allocation priority to UEs that are served by a lower priority other access node.

20 Claims, 4 Drawing Sheets

DYNAMIC SHARING OF SECONDARY NODE RESOURCES AMONG MULTIPLE PRIMARY NODES IN DUAL-CONNECTIVITY SERVICE

BACKGROUND

A cellular wireless network typically includes a number of access nodes (e.g., base stations) that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

In accordance with the RAT, each access node could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each such carrier could be structured to define various physical channels for carrying information between the access node and UEs.

Over the years, the industry has embraced various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

Overview

When a UE enters into coverage of an example network, the UE could detect threshold strong coverage of an access node (e.g., a threshold strong reference signal broadcast by the access node) on a particular carrier and could then engage in random-access and Radio Resource Control (RRC) signaling to establish an RRC connection through which the access node will serve the UE on that carrier.

Further, if the UE is not already registered for service with the core network, the UE could transmit to the access node an attach request, which the access node could forward to a core-network controller for processing. And the core-network controller could then coordinate setup for the UE of one or more bearers extending between the UE and a core-network gateway that provides transport-network connectivity.

Once the UE is so connected and registered, the access node could then serve the UE in a connected mode on the carrier, managing downlink air-interface communication of packet data to the UE and uplink air-interface communication of packet data from the UE. For example, when packet data for the UE arrives at the core network from a transport network, the data could flow to the UE's serving access node, and the access node could then schedule and provide transmission of that data to the UE on particular downlink air-interface resources of the carrier. Likewise, when the UE has data to transmit on the transport network, the UE could transmit a scheduling request to the access node, the access node could responsively schedule transmission of that data from the UE on particular uplink air-interface resources of the carrier, and the UE could accordingly transmit the data to the access node for forwarding through the core network to the transport network.

As the industry advances from one generation of wireless technology to the next, networks and UEs may also support simultaneous connectivity on connections according to multiple different RATs.

With the transition from 4G to 5G, for instance, it is expected that networks and UEs will be configured to support connections according to both RATs concurrently, with an arrangement referred to as EUTRA-NR Dual Connectivity (EN-DC). To facilitate this, a cell site could be configured to provide a coverage area on both 4G and 5G, with a 4G access node providing service on one or more 4G carriers and a 5G access node providing service on at least one 5G carrier. Further, a UE could include both a 4G radio that establishes a 4G connection on a 4G carrier and a 5G radio that establishes a 5G connection on a 5G carrier. Thus, when the UE is in the coverage area, the UE could establish a 4G connection and a 5G connection and could be served with packet-data communications on those two connections concurrently, with a portion of data flowing over the UE's 4G connection and another portion of the data flowing over the UE's 5G connection.

More generally, dual-connectivity service of a UE could involve the UE having co-existing connections with two or more different access nodes, perhaps according to multiple different RATs, and being served with packet-data communication concurrently on those multiple different connections. This is to be distinguished from standalone (or single-connectivity) service of a UE, where the UE is served with packet-data communication by just a single access node according to a particular RAT, such as by just a 4G access node or just a 5G access node for instance.

Dual-connectivity can thus leverage and/or facilitate transition of a network from one RAT to another. Further, dual connectivity can help to provide UEs with increased peak data rate by multiplexing packet-data onto multiple concurrent connections. Dual-connectivity could thus be desirable for a UE that is or will be engaged in high-throughput communication.

With dual-connectivity service, one of the UE's serving access nodes could be deemed the UE's primary serving access node, and the other of the UE's serving access nodes could be deemed the UE's secondary serving access node. With this arrangement, when the UE is within coverage of a cell site that includes both the primary access node and the secondary access node, the UE could initially search for and discover coverage of the primary access node and establish a primary connection with that access node. And once the UE is so connected, the primary access node could then coordinate setup for the UE of a secondary connection with the secondary access node, so that the two access nodes can then cooperatively provide the UE with dual-connectivity service.

For instance, with EN-DC, a 4G access node could be the UE's primary access node, and a 5G access node could be the UE's secondary access node. Accordingly, when the UE is within coverage of a cell site that includes a 4G access node and a 5G access node, the UE could initially search for and discover coverage of the 4G access node and could establish a primary 4G connection with the that access node. Once the UE is so connected, the 4G access node could then engage in a process to coordinate setup for the UE of a secondary 5G connection with the 5G access node. The 4G and 5G access nodes could then provide the UE with EN-DC service, with the 4G access node serving the UE on the UE's primary 4G connection concurrently with the 5G access node serving the UE on the UE's secondary 5G connection.

One situation that could arise in a representative network is that multiple access nodes could be configured to make use of the same other access node for dual-connectivity service. For example, in a network that supports EN-DC service, multiple 4G access nodes might be configured to use the same 5G access node as each other for providing UEs with EN-DC service.

Without limitation, an example of this could occur in a heterogeneous network (HetNet) that includes a macro cell site having collocated 4G and 5G access nodes and further includes a separate 4G small-cell access node that lacks a collocated 5G access node. In that situation, the macro 4G access node may be able to configure EN-DC service for its served UEs by setting up secondary 5G connections with its collocated macro 5G access node. And as the small-cell 4G access node lacks a collocated 5G access node, the small-cell 4G access node may be able to configure EN-DC service for its served UEs by making use the same macro 5G access node. For instance, the small-cell 4G access node might engage in network signaling with the macro cell site to set up such secondary 5G connections for its served UEs. With this arrangement, the macro 5G access node would thus be used as a secondary access node both for one or more UEs served by the macro 4G access node and for one or more UEs served by the small-cell 4G access node.

When this situation arises, a technical issue may then be how to allocate resources of the jointly-used access node for use in dual-connectivity service of UEs served by other access nodes. For instance, with the example HetNet described above, at issue may be how to allocate resources of the macro 5G access node for use in dual-connectivity service of UEs served by the macro 4G access node and for use in dual-connectivity service of UEs served by the small-cell 4G access node. In particular, at issue may be how to allocate air-interface resources or other resources of the 5G access node in such a scenario.

Per the present disclosure, resources of the jointly-used access node could be dynamically allocated for use in dual-connectivity service of UEs served by other access nodes, with the dynamic allocation being based at least on respective priorities designated for the other access nodes. For instance, each other access node could be prioritized based on its type, such as whether it is a macro access node, a small-cell access node, an indoor access node, an access node for a special event, or a access node for dedicated service, among other possibilities, and allocation of resources of the jointly-used access node could be defined based on these priorities.

With the EN-DC example above, for instance, the macro 4G access node might be deemed to have higher priority than the small-cell 4G access node. Therefore, a greater extent of air-interface resources of the jointly-used macro 5G access node might be allocated for use in dual-connectivity service of UEs served by the macro 4G access node than for use in dual-connectivity service of UEs served by the small-cell 4G access node. Alternatively, other relative prioritizations and associated resource allocations could be defined.

This dynamic allocation of resources could be carried out in the time domain, in the frequency domain, and/or in another manner. For example, if the resources of the jointly-used access node are defined in time intervals, more of those time intervals of resources could be reserved for use in dual-connectivity service of UEs that are served by a higher-priority other access node than for use in dual-connectivity service of UEs that are served by a lower-priority other access node. And in addition or alternatively, if the resources of the jointly-used access node are defined in frequency ranges, more of those frequency ranges could be reserved for use in dual-connectivity service of UEs that are served by a higher-priority other access node than for use in dual-connectivity service of UEs that are served by a lower-priority other access node.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of EN-DC service. In particular, the example implementation will be described in the context a network that includes a macro cell site having a 4G LTE access node (evolved Node-B (eNB)) and a 5G NR access node (next generation Node-B (gNB)) and, separate from the macro cell site, a small-cell 4G LTE eNB, and where the macro eNB and small-cell eNB are each configured to set up EN-DC service using the macro gNB as a secondary node.

It should be understood, however, that the principles disclosed herein could extend to apply in other scenarios as well, such as with respect to other RATs and other access-node arrangements. Further, variations from the specific arrangements and processes described are possible. For instance, various described entities, connections, functions, and other elements could be added, omitted, distributed, re-located, re-ordered, combined, or changed in other ways.

Figure 1:
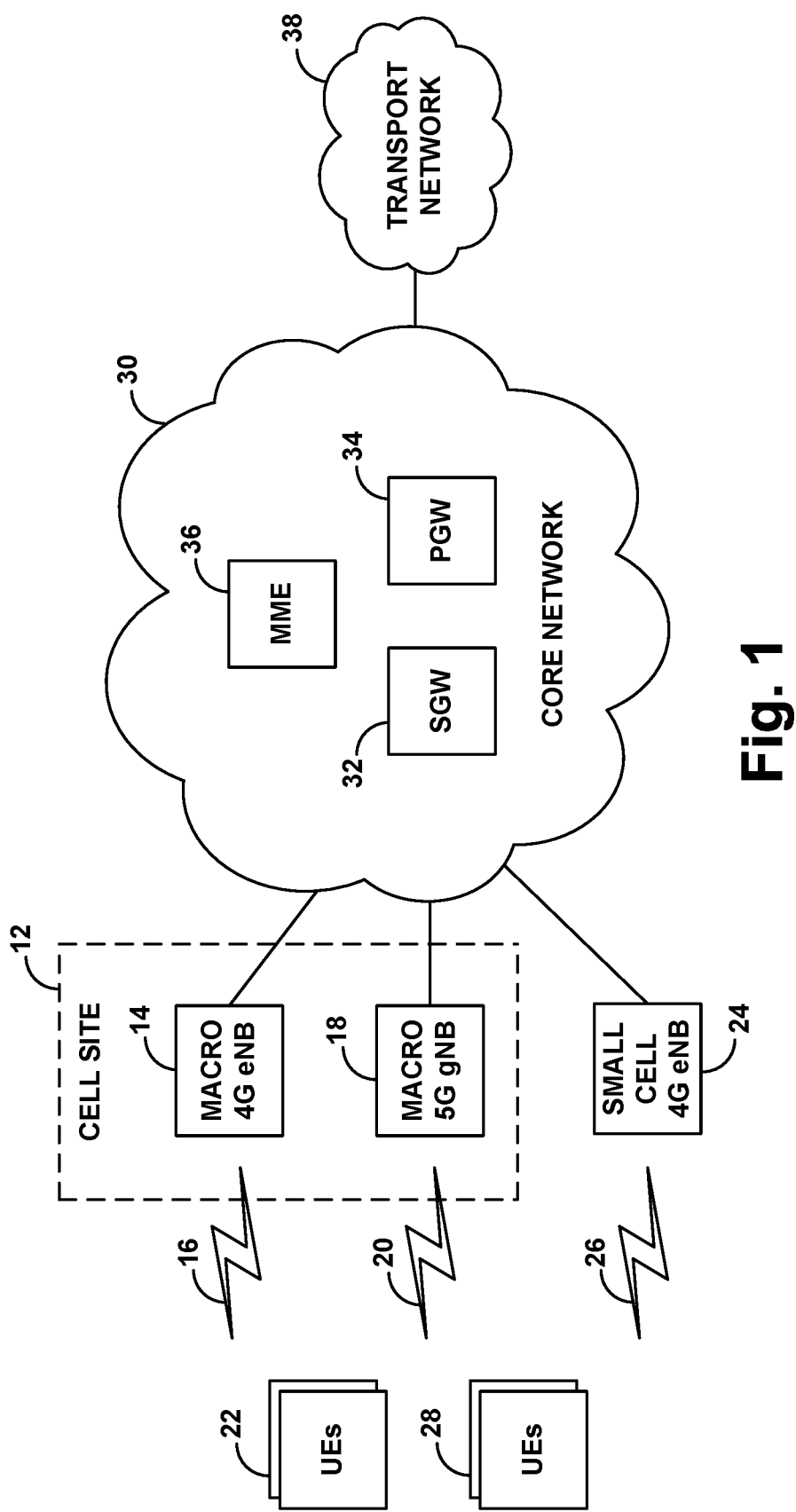
FIG. 1 is a simplified block diagram of an example network arrangement in which features of the present disclosure can be implemented.

FIG. 1 depicts an example network having a macro cell site 12 that includes a 4G eNB 14 that is configured to provide 4G service on one or more 4G carriers 16, and a 5G gNB 18 that is configured to provide 5G service one or more 5G carriers 20. These access nodes could be collocated with each other at the cell site (e.g., sharing a common antenna tower and other equipment) and could provide coverage in largely the same direction as each other, to define overlapping coverage in which UEs 22 can receive both 4G service from the 4G eNB 14 and 5G service from the 5G gNB 18.

Further, FIG. 1 depicts a small-cell 4G eNB 24 that is configured to provide 4G service on one or more 4G carriers 26. In an example arrangement, small-cell 4G eNB 24 is separate from macro cell site 12 but provides coverage that overlaps at least partly with coverage of 5G gNB 18, so that UEs 28 can receive both 4G service from small-cell 4G eNB 24 and 5G service from 5G gNB 18.

In representative 4G and 5G implementations, each carrier could be FDD or TDD and could thus define separate downlink and uplink frequency channels or a single frequency channel multiplexed over time between downlink and uplink use. In any event, each frequency channel of a carrier could be characterized by a defined frequency bandwidth (width in radio-frequency (RF) spectrum) and center frequency and may have a unique carrier identifier.

The air interface provided by a given 4G or 5G carrier could be divided over time into frames, subframes, timeslots, and symbol time segments, and over frequency into subcarriers, thus defining an array of air-interface resource elements in which subcarriers can be modulated to carry data. In each subframe, timeslot, or the like, the resource elements could then be divided into groups defining physical resource blocks (PRBs), which the access node could allocate for use to carry data to or from served UEs.

Further, 4G service and 5G service could differ from each other in various ways now known or later developed, such as with one implementing variable subcarrier spacing and the other having fixed subcarrier spacing, with one having flexible TDD configuration and the other having fixed TDD configuration, with one having different symbol time segments than the other, and/or with one making different use of MIMO technologies than the other, among other possibilities.

As further shown, each of the example 4G and 5G access nodes has a connection with a common core network 30, such as an Evolved Packet Core (EPC) network or Next Generation Core (NGC) network. In the example shown, the core network includes a serving gateway (SGW) 32, a packet data network gateway (PGW) 34, and a mobility management entity (MME) 36, but other arrangements are possible as well. Each 4G and 5G access node could have an interface with the SGW, the SGW could have an interface with the PGW, and the PGW could provide connectivity with a transport network 38. In addition, each 4G and 5G access node could have an interface with the MME, and the MME could have an interface with the SGW, so that the MIME could coordinate setup of bearer connections for UEs to enable the UEs to engage in packet-data communication via 4G and 5G.

In the arrangement of FIG. 1, each of UEs 22, 28 could be configured to support EN-DC service. For instance, each UE could be equipped with a 4G radio and associated components to establish a 4G connection with a 4G eNB and to engage in 4G service over that connection, a 5G radio and associated components to establish a 5G connection with a 5G gNB and to engage in 5G service over that connection, and associated logic to support engaging in EN-DC service.

In a representative implementation, macro cell site 12 could be configured to support providing EN-DC service for UEs 22 that are within coverage of both 4G eNB 14 and 5G gNB 18. In practice, 4G eNB 14 could operate as a master node (MN) and control-signaling anchor for the EN-DC service, and 5G gNB 18 would operate as a secondary node (SN) for the EN-DC service. Further, in certain EN-DC implementations, both 4G and 5G could be used for downlink data communication, but just one of those connections (e.g., just 4G or just 5G) could be used for uplink data communication.

As each such UE 22 initially enters into coverage of the macro cell site, the UE could scan and detect coverage of the 4G eNB 14 and the UE could engage in random-access signaling and RRC connection signaling with the 4G eNB 14 to establish a 4G RRC connection over which to be served by the 4G eNB 14. In addition, if appropriate, the UE could then engage in attach signaling with the MME via the UE's 4G connection. And the MME and 4G eNB 14 could coordinate setup for the UE of a data bearer including an access-bearer portion extending between the 4G eNB 14 and the SGW/PGW and a radio-bearer portion extending over the air between the 4G eNB 14 and the UE.

Once the UE is connected with the 4G eNB 14, the 4G eNB 14 could serve the UE with packet-data communications. For instance, when the 4G eNB 14 receives packet-data for transmission to the UE, the 4G eNB 14 could buffer the data pending transmission, and the 4G eNB 14 could select downlink PRBs in an upcoming subframe on the 4G carrier to carry at least a portion of the data to the UE and could schedule and provide transmission of the data to the UE on those PRBs. And when the UE has packet-data for transmission to the 4G eNB 14, the UE could buffer the data pending transmission, the UE could send to the 4G eNB 14 a scheduling request including a buffer status report (BSR) indicting the amount of data currently buffered, the 4G eNB 14 could select uplink PRBs on the 4G carrier when available to carry at least a portion of the data from the UE and could schedule that transmission, and the UE could accordingly transmit the data to the 4G eNB 14 on those PRBs.

Further, the 4G eNB 14 could also coordinate setup of EN-DC service for the UE. To do so, in an example implementation, the 4G eNB 14 could direct the UE to scan for coverage on the one or more carriers 20 of the 5G gNB 18, and the UE could responsively report to the 4G eNB 14 that the UE detects threshold strong coverage of 5G gNB 18. Given this, the 4G eNB 14 could then engage in signaling with the UE and inter-NB signaling with the 5G gNB 18 to arrange for setup of a 5G RRC connection between the 5G gNB 18 and the UE.

In addition, as part of setting up EN-DC service, the 4G eNB 14 could further coordinate or trigger setup for the UE of a split bearer, so that the UE's packet-data communication can then be multiplexed between the UE's 4G connection and the UE's 5G connection. For instance, a bearer split could be defined at the SGW, establishing separate access-bearer legs extending respectively between the SGW and the 4G eNB 14 and between the SGW and the 5G gNB 18. Alternatively, a bearer split could be defined at the 4G eNB 14, through an inter-NB interface between the 4G eNB 14 and the 5G gNB 18. Or still alternatively, the UE's access bearer could be transferred from the 4G eNB 14 to the 5G gNB 18, and a bearer split could be defined at the 5G gNB 18, likewise through an inter-NB interface between the 5G gNB 18 and the 4G eNB 14.

With EN-DC service so set up, when the core network has packet-data to transmit to the UE, a portion of the data could be provided to the 4G eNB 14 for the 4G eNB 14 to transmit to the UE over the UE's 4G connection as discussed above, and another portion of the data could be provided to the 5G gNB 18 for transmission to the UE over the UE's 5G connection in the same manner. Thus, the 4G eNB 14 could buffer the data that it will transmit to the UE and, when appropriate, could allocate 4G downlink PRBs to carry the data to the UE and could accordingly transmit the data to the UE. And the 5G gNB 18 could likewise buffer the data that it will transmit to the UE and, when appropriate, could allocate 5G downlink PRBs to carry the data to the UE and could accordingly transmit the data to the UE.

Similarly, when the UE has data to transmit, the UE could transmit a portion of the data to the 4G eNB 14 and another portion to the 5G gNB 18. For instance, the UE could send a scheduling request including a BSR for some data to the 4G eNB 14, the 4G eNB 14 could allocate 4G uplink PRBs to carry that data, and the UE could transmit the data to the 4G eNB 14. And the UE could send a scheduling request including a BSR for other data to the 5G gNB 18, the 5G gNB 18 could allocate 5G uplink PRBs to carry that data, and the UE could transmit the data to the 5G gNB. Or alternatively, if the EN-DC implementation uses just one of the UE's connections for uplink data communication, scheduling and transmission could proceed accordingly.

In contrast to macro cell site 12, small-cell 4G eNB 24 does not have a collocated 5G gNB that could be used for providing EN-DC service. Instead, when UEs 28 are connected with small-cell 4G eNB 24, the small-cell 4G eNB 24 could also make use of macro 5G gNB 18 to provide secondary connectivity for the UEs, to facilitate EN-DC service.

To do this for a given UE 28, small-cell 4G eNB 24 could similarly direct the UE to scan for coverage on the one or more carriers 20 of the 5G gNB 18, and the UE could responsively report to the small-cell eNB 24 that the UE detects threshold strong coverage of 5G gNB 18. Given this, the small-cell 4G eNB 24 could then engage in signaling with the UE and inter-NB signaling with the 5G gNB 18 to arrange for setup of a 5G RRC connection between the 5G gNB 18 and the UE.

Further, as part of setting up this EN-DC service, the small-cell 4G eNB 24 could similarly coordinate or trigger setup for the UE of a split bearer perhaps in the same manner as discussed above, so that the UE's data communication can then be multiplexed similarly between the UE's 4G connection with the small-cell 4G eNB 24 and the UE's 5G connection with the 5G gNB 18.

Thus, here similarly, when the core network has packet-data to transmit to the UE, a portion of the data could be provided to the small-cell 4G eNB 24 for the small-cell 4G eNB 24 to transmit to the UE over the UE's 4G connection as discussed above, and another portion of the data could be provided to the 5G gNB 18 for transmission to the UE over the UE's 5G connection in the same manner. Accordingly, the small-cell 4G eNB 24 could buffer the data that it will transmit to the UE and, when appropriate, could allocate 4G downlink PRBs to carry the data to the UE and could accordingly transmit the data to the UE. And the 5G gNB 18 could likewise buffer the data that it will transmit to the UE and, when appropriate, could allocate 5G downlink PRBs to carry the data to the UE and could accordingly transmit the data to the UE.

Similarly, when the UE has data to transmit, the UE could transmit a portion of the data to the small-cell 4G eNB 24 and another portion to the 5G gNB 18. For instance, the UE could send a scheduling request including a BSR for some data to the small-cell 4G eNB 14, the small-cell 4G eNB 24 could allocate 4G uplink PRBs to carry that data, and the UE could transmit the data to the small-cell 4G eNB 24. And the UE could send a scheduling request including a BSR for other data to the 5G gNB 18, the 5G gNB 18 could allocate 5G uplink PRBs to carry that data, and the UE could transmit the data to the 5G gNB. Or alternatively again here, if the EN-DC implementation uses just one of the UE's connections for uplink data communication, scheduling and transmission could proceed accordingly.

In a scenario such as this, where the 5G gNB is being used as a secondary access node for dual-connectivity service of one or more UEs served by the macro 4G eNB 14 and also as a secondary access node for dual-connectivity service of one or more UEs served by the small-cell 4G eNB 24, at issue as noted above is how to allocate resources of the 5G gNB among the UEs. For instance, with the 5G gNB operating on one or more carriers, at issue may be what extent of the 5G-carrier resources to allocate for use in dual-connectivity service of UEs that are served by the macro 4G eNB 14 and what extent of the 5G-carrier resources to allocate for use in dual-connectivity service of UEs that are served by the small-cell 4G eNB 24.

More generally, when an access node will be used as a secondary access node for dual-connectivity service of UEs that are served by various different master access nodes, at issue may be how to allocate resources of the access node among those UEs.

In practice, the 5G gNB 18 could be responsible for allocating use of the air-interface resources on its 5G carrier(s). Therefore, the 5G gNB 18 could be the entity that faces and addresses this issue. For instance, a resource scheduler of the 5G gNB 18 could face this issue when working to allocate PRBs of the 5G carrier(s) among UEs for use in dual-connectivity service of those UEs. Alternatively, one or more other entities could face and address this issue.

As noted above, the present disclosure provides for dynamically resolving this issue based on relative prioritizations of various master nodes, such as relative prioritizations of various types of master nodes. For instance, the 5G gNB 18 could be set to give higher resource-scheduling priority to UEs that are served by a first type of 4G eNB than to UEs that are served by a second type of 4G eNB.

Various bases could be exist for these relative prioritizations. For example, it may be worthwhile for the 5G gNB to give higher resource-scheduling priority to UEs that are served by a type of 4G eNB that provides narrower or weaker coverage than another type of 4G eNB. Or it may be worthwhile for the 5G gNB to give higher resource-scheduling priority to UEs that are served by a type of 4G eNB that is implemented for a special or important purpose, such as to provide service at a special event or for emergency response or the like. Other examples may be possible as well.

To facilitate this in practice as the 5G gNB is serving multiple UEs, the 5G gNB could maintain for each UE an indication of the type of 4G eNB that is serving the UE. For instance, when the UE's serving 4G eNB engages in signaling with the 5G gNB to coordinate setup of a 5G secondary connection for the UE, the 4G eNB could include in that signaling a specification of the 4G eNB's type, and the 5G gNB could record that information in a context record for the UE. Or the 5G gNB might be provisioned with a neighbor list that specifies the type of each of various 4G eNBs, and the 5G gNB may refer to that data to determine the type of 4G eNB that is serving a given UE based on an identity of the UE's serving 4G eNB for instance.

Further, the 5G gNB could be provisioned with prioritization data that specifies relative prioritizations of various types of 4G eNBs. Thus, given the type of 4G eNB that is serving a UE, the 5G gNB could refer to this prioritization data to determine a relative priority that the 5G gNB should use in allocating its 5G resources for data communication to or from the UE. And given the type of 4G eNB that is serving another UE, the 5G gNB could refer to the prioritization data to determine a possibly different relative priority that the 5G gNB should use in allocating its 5G resources for data communication to or from the other UE.

In an example implementation, this prioritization data could designate higher priority for small-cell type 4G eNBs than for macro-type 4G eNBs. For instance, the prioritization data could designate priority "1" (highest priority) for small-cell 4G eNBs and priority "2" (a lower priority) for macro 4G eNBs. Thus, referring to this data and to UE context data, the 5G gNB could determine each UE 28 served by small-cell 4G eNB 24 should receive higher resource-scheduling priority than each UE 22 served by macro 4G eNB 14.

In another example implementation, the prioritization data could designate priority "HIGH" for indoor 4G eNBs and priority "LOW" for outdoor 4G eNBs. Thus, referring to this data and to UE context data, the 5G gNB could determine that each UE served by an indoor 4G eNB should receive higher resource-scheduling priority than each UE served by an outdoor 4G eNB.

And yet in another example implementation, the prioritization data could designate priority "HIGH" for 4G eNBs that are in place to provide dedicated service such as public safety communication service, priority "MEDIUM" for 4G eNBs that are in place to serve special events such as concerts or sports events, and priority "LOW" for 4G eNBs that are in place for general use (e.g., not for dedicated service or special events). Thus, referring to this data and to UE context data, the 5G gNB could determine that each UE served by a dedicated-service 4G eNB should receive the highest resource-scheduling priority, each UE served by a special-event 4G eNB should receive medium resource-scheduling priority, and each UE served by a general-use 4G eNB should receive the lowest resource-scheduling priority.

Numerous other examples could be possible as well.

The 5G gNB could implement these different resource-scheduling priorities in various ways, to allocate resources of its 5G carrier(s) for use in EN-DC service of UEs served by various types of 4G eNBs.

By way of example, when the 5G gNB is serving multiple UEs and has data queued for transmission respectively to each UE, the 5G gNB may normally apply a scheduling process to manage allocation of PRBs for carrying packet data to or from the UEs. This scheduling could take various forms. For instance, the 5G gNB could generally apply round-robin scheduling among all of its served UEs, but the 5G gNB could apply different scheduling weights on certain bases so as to allocate PRBs at a different rate to some UEs than to other UEs. Here, one such basis for differentially prioritizing scheduling of PRBs would be the type of 4G eNBs serving the UEs at issue. For instance, putting other weighting factors aside for sake of discussion, the 5G gNB could give UEs 28 served by small-cell 4G eNB 24 twice the resource-priority as UEs 22 served by macro 4G eNB 14 by allocating twice as many PRBs per unit time to UEs 28 than to UEs 22.

Alternatively, the 5G gNB could reserve a certain portion of its resources for use to serve UEs served by one type of 4G eNB and a different portion of its resources for use to serve UEs served by a different type of 4G eNB. For instance, again to UEs 28 served by small-cell 4G eNB 24 twice the resource-priority as UEs 22 served by macro 4G eNB 14, the 5G gNB could reserve ⅔ of its PRBs per unit time for allocation to UEs 28 and just ⅓ of its PRBs per unit time for allocation to UEs 22. Other examples are possible as well.

Note also that the 5G gNB could carry out this dynamic prioritization in the frequency domain and/or in the time domain. For instance, in one implementation, the 5G gNB could allocate a greater extent of subframes or other time intervals to UEs being served by higher-priority 4G eNBs than to UEs being served by lower-priority 4G eNBs. And in another implementation, the 5G gNB could allocated a greater extent of PRBs in a given subframe or other time interval to UEs being served by higher-priority 4G eNBs than to UEs being served by lower-priority 4G eNBs.

The 5G gNB could then control its allocation of resources on its 5G carrier(s) accordingly. For instance, the resource scheduler of the 5G gNB could work to ensure that the resources are allocated in the determined manner.

Figure 2:
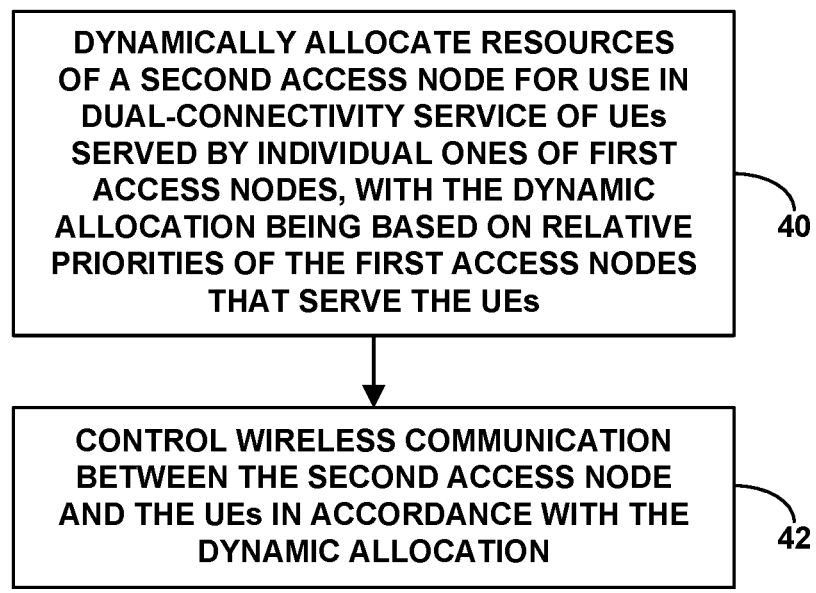
FIG. 2 is a flow chart depicting an example method in accordance with the present disclosure.

FIG. 2 is next a flow chart depicting a method for controlling wireless communication in a system that includes multiple first access nodes (e.g., multiple 4G eNBs) and at least one second access node (e.g., a 5G gNB). This method could be carried out by the system by being carried out by second access node and/or by one or more other entities.

As shown in FIG. 2, at block 40, the method includes the system dynamically allocating resources of the second access node for use in dual-connectivity service of UEs served by individual ones of the first access nodes, with the dynamic allocation being based on relative priorities of the first access nodes serving the UEs. Further, at block 42, the method includes the system controlling wireless communication between the second access node and the UEs in accordance with the dynamic allocation.

In line with the discussion above, the second access node could operate as a secondary access node in the dual-connectivity service of the UEs. For instance, each of the first access nodes could operate as primary or master nodes with which the UEs first connect, and each such first access node could coordinate or trigger setup for each such UE of secondary connectivity with the second access node. As further discussed above, the dual-connectivity service could be EN-DC service.

As additionally discussed above, the relative priorities of the first access nodes in this method could be based on types of the first access nodes. For instance, the method could include referring to prioritization data that correlates the types of the first access nodes with the relative priorities, to determine respectively for each of the UEs a respective resource-allocation priority for use in the allocating of the resources of the second access node, based on a type of the first access node that is serving the UE. Further, as noted above, example types could include, without limitation, macro, small-cell, indoor, outdoor, dedicated-service, special-event, and general-use.

In an example implementation, the method could include assigning to a first one of the UEs a first resource-allocation priority based on the first access node that is serving the first UE being of a first type, and assigning to a second one of the UEs a second resource-allocation priority different than the first resource-allocation priority based on the first access node serving the second UE being of a second type different than the first type. And in that case, the act of dynamically allocating the resources of the second access node could involve using the assigned first resource-allocation priority for resource allocation to the first UE while using the assigned second resource-allocation priority for resource allocation to the second UE.

More specifically, the method could include assigning to a first one of the UEs a first resource-allocation priority based on the first access node that is serving the first UE being a small-cell access node rather than a macro cell access node, and assigning to a second one of the UEs a second resource-allocation priority different than the first resource-allocation priority based on the first access node serving the second UE being a macro cell access node rather than a small-cell access node. And in that case, the act of dynamically allocating the resources of the second access node could involve using the assigned first resource-allocation priority for resource allocation to the first UE while using the assigned second resource-allocation priority for resource allocation to the second UE. Here, for instance, the first resource-allocation priority could be higher than the second resource-allocation priority.

Figure 3:
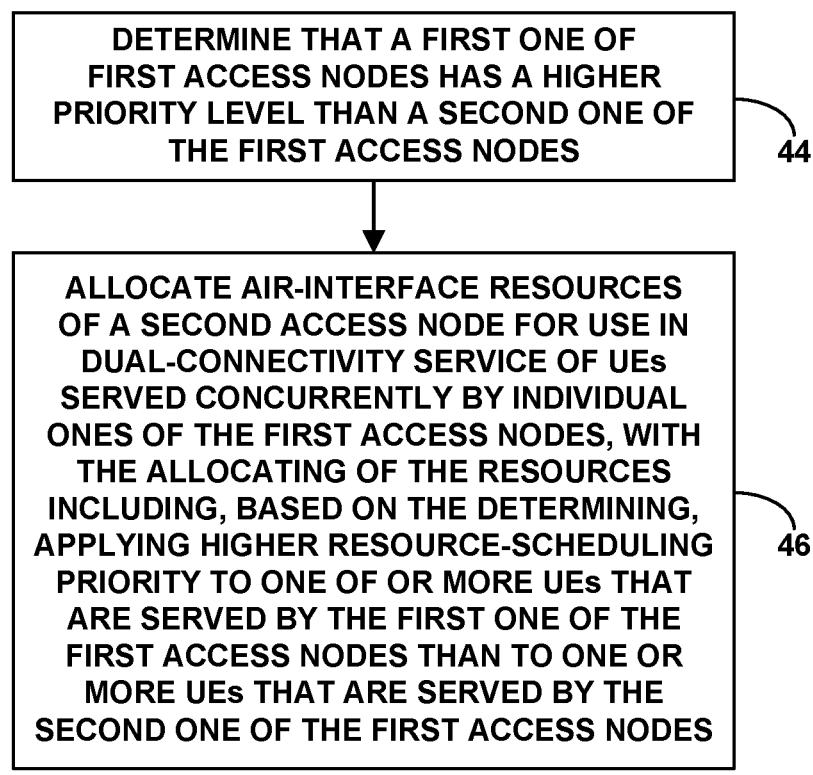
FIG. 3 is another flow chart depicting an example method in accordance with the present disclosure.

Still further, as discussed above, the dynamic allocation could be carried out in the time domain and/or in the frequency domain, and with respect to downlink data communication from the second access node to the UEs and/or with respect to uplink data communication from the UEs to the second node. And as noted above, the resources of the second access node that are allocated in this process could be PRBs defined on one or more carriers on which the second access node is configured to provide service FIG. 3 is next a flow chart depicting a method operable in a wireless communication system that includes multiple first access nodes and at least one second access node, the method being for allocating air-interface resources of the second access node. This method, too, could be carried out by the second access node and/or by one or more other entities.

As shown in FIG. 3, at block 44, the method includes determining that a first one of the first access nodes has a higher priority level than a second one of the first access nodes (perhaps by referring to prioritization data as noted above). And at block 46, the method includes allocating the air-interface resources of the second access node for use in dual-connectivity service of UEs served concurrently by individual ones of the first access nodes, with the allocating of the resources including, based on the determining, applying higher resource-scheduling priority to one of or more UEs that are served by the first one of the first access nodes than to one or more UEs that are served by the second one of the first access nodes.

Various features discussed above can be applied in this context, and vice versa.

For example, in this method too, the dual-connectivity service could be EN-DC, the second access node could be a secondary access node for the dual-connectivity service, and the method could be carried out by the second access node. Further, the act of determining that the first one of the first access nodes has a higher priority level than the second one of the first access nodes could be based on the first one of the first access nodes being of a first type and the second one of the first access nodes being of a second type.

Figure 4:
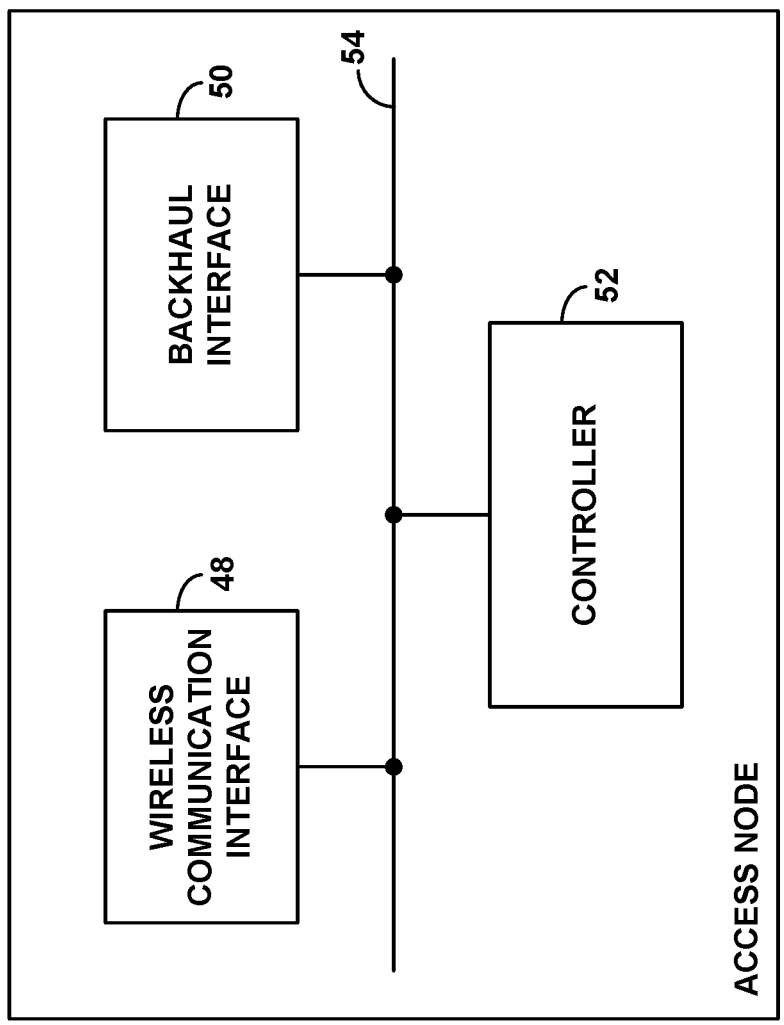
FIG. 4 is a simplified block diagram of an example access node operable in accordance with the present disclosure.

FIG. 4 is next a simplified block diagram depicting an example of a second access node (e.g., 5G gNB) that could operate in accordance with the present disclosure within a wireless communication system that includes a plurality of first access nodes and at least the second access node. As shown in FIG. 4, the example second access node includes a wireless communication interface 48, a backhaul interface 50, and a controller 52, all of which may be communicatively linked together by a system bus, network, or other connection mechanism 54.

The wireless communication interface 48 could comprise an antenna structure through which the second access node is configured to serve UEs over an air interface, the air interface defining resources such as PRBs for carrying data over the air interface. And the backhaul interface 50 could comprise a wired or wireless interface, such as an Ethernet network communication interface, through which the second access node is configured to engage in network communication with other entities, such as with the first access nodes and with various core-network entities.

Further, controller 52 could comprise a processing unit (e.g., one or more general purpose processors and/or specialized processors) programmed to cause the second access node to carry out various operations such as those discussed above. For instance, the controller could comprise non-transitory data storage (e.g., one or more magnetic, optical, or flash storage components) holding program instructions executable by the processing unit to cause the second access node to carry out such operations.

Various operations discussed above can be carried out in this context, and vice versa.

Exemplary embodiments have been described above. Those skilled in the art will understand, however, that changes and modifications may be made to these embodiments without departing from the true scope and spirit of the invention.

We claim:

1. A method for controlling wireless communication in a system including a plurality of first access nodes and at least one second access node, the method comprising:
dynamically allocating, by the system, resources of the second access node for use in dual-connectivity service of user equipment devices (UEs) served by individual ones of the first access nodes, wherein the dynamic allocation is based on relative priorities of the first access nodes serving the UEs; and
controlling, by the system, wireless communication between the second access node and the UEs in accordance with the dynamic allocation.

2. The method of claim 1, wherein the second access node operates as a secondary access node in the dual-connectivity service of the UEs.

3. The method of claim 1, wherein the dual-connectivity service is EN-DC service.

4. The method of claim 1, carried out by the second access node.

5. The method of claim 1, wherein the relative priorities of the first access nodes are based on types of the first access nodes.

6. The method of claim 5, further comprising referring to prioritization data that correlates the types of the first access nodes with the relative priorities, to determine respectively for each of the UEs a respective resource-allocation priority for use in the allocating of the resources of the second access node.

7. The method of claim 5, wherein each of the types is selected from the group consisting of macro, small-cell, indoor, outdoor, dedicated-service, special-event, and general-use.

8. The method of claim 1, wherein the resources of the second access node comprise physical resource blocks defined on one or more carriers on which the second access node is configured to provide service.

9. The method of claim 1, further comprising:
assigning to a first one of the UEs a first resource-allocation priority based on the first access node that is serving the first UE being of a first type; and
assigning to a second one of the UEs a second resource-allocation priority different than the first resource-allocation priority based on the first access node serving the second UE being of a second type different than the first type,
wherein dynamically allocating the resources of the second access node comprises using the assigned first resource-allocation priority for resource allocation to the first UE while using the assigned second resource-allocation priority for resource allocation to the second UE.

10. The method of claim 1, further comprising:
assigning to a first one of the UEs a first resource-allocation priority based on the first access node that is serving the first UE being a small-cell access node rather than a macro cell access node; and
assigning to a second one of the UEs a second resource-allocation priority different than the first resource-allocation priority based on the first access node serving the second UE being a macro cell access node rather than a small-cell access node,
wherein dynamically allocating the resources of the second access node comprises using the assigned first resource-allocation priority for resource allocation to the first UE while using the assigned second resource-allocation priority for resource allocation to the second UE.

11. The method of claim 10, wherein the first resource-allocation priority is higher than the second resource-allocation priority.

12. The method of claim 1, wherein the dynamic allocation is carried out in at least one of the time domain or the frequency domain.

13. The method of claim 1, carried out with respect to downlink data communication from the second access node to the UEs.

14. The method of claim 1, carried out with respect to uplink data communication from the UEs to the second node.

15. In a wireless communication system that includes a plurality of first access nodes and at least one second access node, a method for allocating air-interface resources of the second access node, the method comprising:
determining that a first one of the first access nodes has a higher priority level than a second one of the first access nodes; and
allocating the air-interface resources of the second access node for use in dual-connectivity service of user equipment devices (UEs) served concurrently by individual ones of the first access nodes, wherein the allocating of the resources includes, based on the determining, applying higher resource-scheduling priority to one of or more UEs that are served by the first one of the first access nodes than to one or more UEs that are served by the second one of the first access nodes.

16. The method of claim 15, wherein the dual-connectivity service is EN-DC, wherein the second access node is a secondary access node for the dual-connectivity service, and wherein the method is carried out by the second access node.

17. The method of claim 15, determining that the first one of the first access nodes has a higher priority level than the second one of the first access nodes is based on the first one of the first access nodes being of a first type and the second one of the first access nodes being of a second type.

18. In a wireless communication system that includes a plurality of first access nodes and at least one second access node, the second access node comprising:
a wireless communication interface including an antenna structure through which the second access node is configured to serve user equipment devices (UEs) over an air interface, wherein the interface defines resources for carrying data over the air interface;
a backhaul interface through which the second access node is configured to engage in network communication; and
a controller having a processing unit programmed to carry out operations including (i) determining that a first one of the first access nodes has a higher priority level than a second one of the first access nodes, (ii) based on the determining, causing the second access node to apply a higher scheduling priority for assigning the resources to UEs served by the first one of the first access nodes than for assigning the resources to UEs served by the second one of the first access nodes.

19. The second access node of claim 18, wherein the dual-connectivity service is EN-DC, and wherein the second access node is a secondary access node for the dual-connectivity service.

20. The second access node of claim 18, wherein determining that the first one of the first access nodes has a higher priority level than the second one of the first access nodes is based on the first one of the first access nodes being of a first type and the second one of the first access nodes being of a second type.

* * * * *